US009174717B2

(12) United States Patent
Kim et al.

(10) Patent No.: US 9,174,717 B2
(45) Date of Patent: Nov. 3, 2015

(54) INTAKE AIR COOLING SYSTEM FOR A MARINE VESSEL HAVING A TURBOCHARGER

(75) Inventors: Eun Kyung Kim, Anyang-si (KR); Sung Jae Lee, Geoje-si (KR); Ki Jung Kim, Geoje-si (KR); Da Ra Heo, Jinju-si (KR); Gun Il Park, Geoje-si (KR); Jae Woong Choi, Geoje-si (KR)

(73) Assignee: SAMSUNG HEAVY IND. CO., LTD (KR)

( * ) Notice: Subject to any disclaimer, the term of this patent is extended or adjusted under 35 U.S.C. 154(b) by 83 days.

(21) Appl. No.: 13/994,700

(22) PCT Filed: Sep. 19, 2011

(86) PCT No.: PCT/KR2011/006916
§ 371 (c)(1),
(2), (4) Date: Aug. 27, 2013

(87) PCT Pub. No.: WO2012/081805
PCT Pub. Date: Jun. 21, 2012

(65) Prior Publication Data
US 2013/0327035 A1 Dec. 12, 2013

(30) Foreign Application Priority Data

Dec. 16, 2010 (KR) .................. 10-2010-0129261
Jul. 8, 2011 (KR) .................. 10-2011-0067845

(51) Int. Cl.
*F02B 29/04* (2006.01)
*B63H 21/14* (2006.01)
(Continued)

(52) U.S. Cl.
CPC ............ *B63H 21/14* (2013.01); *F02B 29/0412* (2013.01); *F02B 29/0443* (2013.01); *F02B 29/0493* (2013.01);
(Continued)

(58) Field of Classification Search
CPC . B63H 21/14; F02B 29/0412; F02B 29/0443; F02B 29/0493; F02B 61/04
USPC .................. 60/599, 602, 605.2, 618; 123/563; 62/79, 238.3, 239; 440/88 C
See application file for complete search history.

(56) References Cited

U.S. PATENT DOCUMENTS 4,270,365 A 6/1981 Sampietro
2009/0031999 A1 2/2009 Erickson

FOREIGN PATENT DOCUMENTS

| BE | 1013535 A | 3/2002 |
|---|---|---|
| CH | 248927 A | 5/1947 |
| EP | 1500802 A | 1/2005 |
| GB | 2164740 | 3/1986 |

(Continued)

*Primary Examiner* — Thai Ba Trieu
*Assistant Examiner* — Dapinder Singh (57) ABSTRACT

Provided is an intake air cooling system for a marine vessel having a turbocharger. The intake air cooling system for the marine vessel includes: a turbocharger which compresses the intake air introduced from the outside using a portion of the exhaust gas generated by the engine, wherein the turbocharger has a front end through which the intake air is introduced and a rear end through which the compressed intake air is supplied to the engine; a cooling part which cools at least one of the intake air compressed in the turbocharger and the exhaust gas passing through the turbocharger, wherein the cooling part includes one or more cooling units disposed along the flow of the intake air or the exhaust gas; and an absorption cooling device which receives heat from the working fluid circulated through the cooling unit.

17 Claims, 8 Drawing Sheets

(51) Int. Cl.
*F01K 23/10* (2006.01)
*F02B 61/04* (2006.01)
*F02B 37/00* (2006.01)
*F01P 3/20* (2006.01)

(52) U.S. Cl.
CPC ............... *F02B 61/04* (2013.01); *F01P 3/207* (2013.01); *F01P 2060/02* (2013.01); *F02B37/00* (2013.01); *Y02T 10/146* (2013.01); *Y02T 10/16* (2013.01)

(56) References Cited

FOREIGN PATENT DOCUMENTS

| | | |
|---|---|---|
| JP | S5370215 A | 6/1978 |
| JP | 55117020 | 9/1980 |
| JP | S5879618 A | 5/1983 |
| JP | 6066866 | 5/1988 |
| JP | 63196463 | 12/1988 |
| JP | 2001193563 A | 7/2001 |
| KR | 100623646 B1 | 9/2006 |
| KR | 100720876 B1 | 5/2007 |
| WO | 9967102 A | 12/1999 |

INTAKE AIR COOLING SYSTEM FOR A MARINE VESSEL HAVING A TURBOCHARGER

TECHNICAL FIELD

The present invention relates to an intake air cooling system, and more particularly, to an intake air cooling system for a marine vessel having a turbocharger.

BACKGROUND ART

A general vessel is equipped with an internal combustion engine such as a diesel engine, for multiple purposes such as generation of propelling power for a vessel or generation of electrical power used in a vessel.

In the internal combustion engine, generally, strokes of intake, compression, explosion, and exhaustion are used to generate power. In a fuel intake process, intake air is introduced with fuel into the inside of the internal combustion engine. An efficiency of the internal combustion engine may be increased by increasing pressure of the intake air.

Accordingly, a vessel equipped with a turbocharger for supplying a large amount of intake air by increasing pressure of the intake air has been recently suggested.

An intake air compression method using the turbocharger includes a supercharger method of mechanically driven by engaging a toothed wheel to a crank shaft of the internal combustion engine and a turbocharger method that is driven by an exhaust turbine using an exhaust gas generated from the internal combustion engine.

Figure 1:
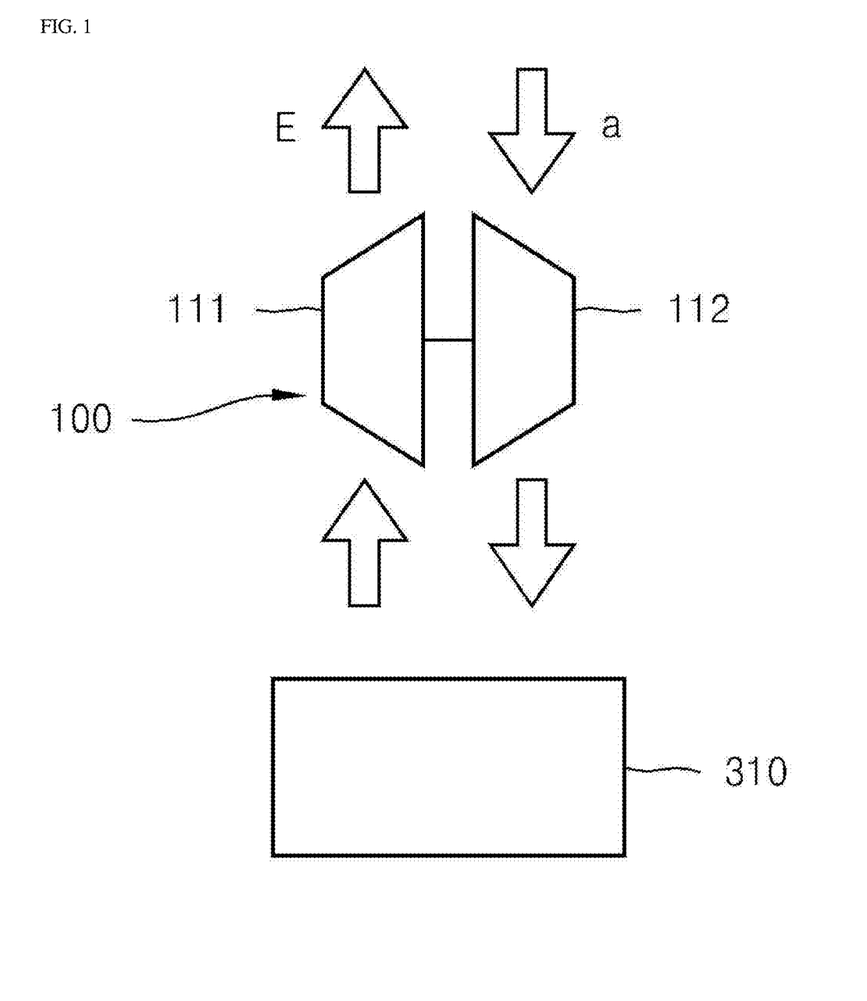
FIG. 1 illustrates a configuration of a marine vessel equipped with a convention turbocharger.

FIG. 1 illustrates an example of a vessel equipped with a turbocharger for compressing an intake air by a turbocharger method.

When an exhaust gas E having certain pressure and temperature is discharged from an internal combustion engine, that is, an engine 310, of the vessel, the exhaust gas E is supplied to a turbocharger 100.

In this state, a rotational force is generated in an exhaust turbine 111 by the energy of the exhaust gas E supplied to the turbocharger 100. The rotational force is transferred to a compression turbine 112 connected to the exhaust turbine 111. The compression turbine 112 compresses an external intake air "a" and supplies the compressed air to the engine 310, by using the rotational force.

In the turbocharger 110, the intake air "a" is compressed in a compression process according to an adiabatic compression process. Thus, a temperature of the intake air "a" after the compression, that is, a temperature of the intake air "a" at a rear end side of the turbocharger 110 increases compared to a temperature of the intake air "a" before the compression, that is, a temperature of the intake air "a" at a front end side of the turbocharger 110.

In general, as the temperature of the intake air "a" supplied to the engine 310 that is the internal combustion engine increases, the efficiency of the engine 310 decreases. In this regard, as the temperature of the intake air "a" at the rear end side after passing through the turbocharger 110 increases, the efficiency of the engine 310 is degraded.

Further, when the vessel is operated in a high temperature environment such as in tropical regions, the intake air "a" is compressed from the front end side of the turbocharger 110 in a state in which the temperature of the intake air "a" is increased, and thus, the efficiency of the engine 310 is further degraded.

DETAILED DESCRIPTION OF THE INVENTION

Technical Problem

The present invention provides an intake air cooling system for a marine vessel which may increase an efficiency of an engine by cooling intake air and supplying the cooled intake air to the engine.

Technical Solution

According to an aspect of the present invention, there is provided an intake air cooling system for a marine vessel which includes a turbocharger compressing externally introduced intake air by using part of exhaust gas generated from an engine and including a front end from which the intake air is introduced and a rear end through which the intake air is supplied to the engine, a cooling part cooling at least one of the intake air compressed in the turbocharger and the exhaust gas passing through the turbocharger and including one or more cooling units arranged along a flow of the intake air or the exhaust gas, and an absorption cooling device receiving a heat source from an operating fluid circulating through the cooling units.

The cooling part may include a first cooling unit through which a first operating fluid that performs heat exchange with the intake air discharged from the turbocharger circulates, and a second cooling unit disposed at the rear of the first cooling unit and through which a second operating fluid that performs heat exchange with the intake air circulates.

At least one of the second operating fluid flowing in the absorption cooling device and seawater outside the marine vessel may flow in the second cooling unit of the cooling part.

The intake air cooling system may further include a second operating fluid path provided between the second cooling unit and the absorption cooling device and through which the second operating fluid flows, and including at least one main valve for selectively opening or closing flow of the second operating fluid, and an auxiliary circulation path connected on the second operating fluid path at a position between the second cooling unit and the main valve and through which the seawater outside the marine vessel flows, and including at least one auxiliary valve for opening or closing flow of the seawater.

The cooling part may further include a third cooling unit through which a third operating fluid that performs heat exchange with the seawater outside the marine vessel circulates.

The intake air cooling system may further include an auxiliary cooling device for performing heat exchange between the third operating fluid and the seawater, in which the cooling of the intake air by the third cooling unit is performed independently of the cooling by the first cooling unit and the second cooling unit.

A third operating fluid circulation path, through which the third operating fluid circulates, may be connected to the first operating fluid path through which the first operating fluid is supplied to the first cooling unit. The intake air cooling system may further include a switch valve for selectively shutting supply of the first operating fluid and performing supply of the third operating fluid, with respect to the first cooling unit, the switch valve being provided at a position of the first operating fluid path to which the third operating fluid circulation path is connected.

A seawater circulation path, through which the seawater circulates, may be connected to a second operating fluid path through which the second operating fluid is supplied to the second cooling unit. The intake air cooling system may further include a switch valve for selectively shutting supply of the second operating fluid and performing supply of the seawater, with respect to the second cooling unit, the switch valve being provided at a position of the second operating fluid path to which the seawater circulation path is connected.

The third cooling unit may be arranged between the first cooling unit and the second cooling unit and a temperature of the second operating fluid flowing in the second cooling unit is lower than that of the third operating fluid flowing in the third cooling unit.

The absorption cooling device may include an evaporator cooling the second operating fluid by using evaporation latent heat of a coolant, an absorber accommodating an absorption liquid that absorbs the coolant evaporated in the evaporator, a regenerator heating and regenerating the absorption liquid of the absorber that is weakened by the absorption of the coolant, by using the intake air discharged from the turbocharger and supplied as the heat source, and a condenser condensing the coolant evaporated in the regenerator.

The absorption cooling device may further include a temperature sensor that senses a temperature of the second operating fluid supplied to the second cooling unit.

The cooling part may include a first cooling unit through which the first operating fluid flows to cool the exhaust gas and a second cooling unit through which the second operating fluid flows to cool the compressed intake air, the first cooling unit is provided on an exhausting manifold that discharges the exhaust gas from the turbocharger and allowing the exhaust gas to perform heat exchange with the first operating fluid, and the second cooling unit is provided between the turbocharger and the engine and performing heat exchange between the intake air compressed in the turbocharger and the second operating fluid.

The cooling part may further include a third cooling unit through which the third operating fluid that performs heat exchange with the seawater outside the marine vessel circulates.

The intake air cooling system may further include an auxiliary cooling device that performs heat exchange between the third operating fluid and the seawater outside the marine vessel, in which the cooling of the intake air by the third cooling unit is performed independently of the cooling by the first cooling unit and the second cooling unit.

The first cooling unit may be a low pressure vapor generator that generates vapor by heat exchange with the exhaust gas.

The absorption cooling device may include an evaporator cooling the operating fluid by using evaporation latent heat of the coolant, an absorber accommodating an absorption liquid that absorbs the coolant evaporated in the evaporator, a regenerator heating and regenerating the absorption liquid of the absorber that is weakened by the absorption of the coolant, by using part of the intake air supplied as the heat source, and a condenser condensing the coolant evaporated in the regenerator.

The cooling part may include a cooling part body in which an intake air flow path through which the intake air flows from the turbocharger to the engine is formed and the one or more cooling units arranged along the intake air flow path are formed.

The one or more cooling units may be formed in a cartridge type to be detachably provided on the cooling part.

The intake air cooling system may further include a drain water processing device that provided between the cooling part and the engine and processes drain water generated from compressed air cooled by passing through the cooling part.

Advantageous Effects

According to the present embodiment, an efficiency of an engine may be increased by cooling intake air supplied to an engine of a marine vessel by using an absorption cooler. Also, since an absorption cooling device for cooling the intake air that has a high temperature and is compressed by the turbocharger is driven by a heat source obtained from the intake air, a separate heat source for driving the absorption cooling device is not needed and thus energy efficiency of a cooling system for cooling the intake air is increased. Also, in the process of supplying to the engine the intake air that has a high temperature and is compressed by the turbocharger, the intake air is cooled through a plurality of steps and thus an efficiency of cooling the intake air is increased compared to a case of cooling the intake air at one time.

BEST MODE

The present invention will now be described more fully with reference to the accompanying drawings, in which exemplary embodiments of the invention are shown.

Figure 2:
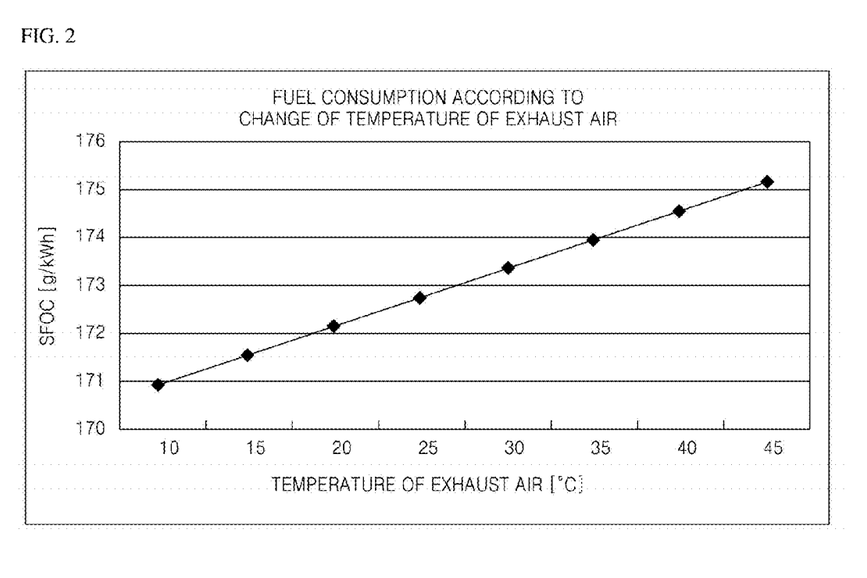
FIG. 2 is a graph showing a relationship between a temperature of intake air and an efficiency of an engine.

FIG. 2 is a graph showing a relationship between a temperature of intake air and an efficiency of an engine. Referring to FIG. 2, as a temperature of intake air supplied to an internal combustion engine such as a diesel engine increases, a specific fuel oil consumption (SFOC) showing a fuel efficiency of the internal combustion engine increases as well.

SFOC signifies mechanical equivalent of fuel consumption. As SFOC increases, fuel consumption that generates the same work in the internal combustion engine increases and thus an efficiency of the internal combustion engine decreases.

In other words, since the temperature of the intake air and a heat efficiency of the internal combustion engine are inversely proportional to each other, to increase the heat efficiency the internal combustion engine, the temperature of the intake air supplied to the internal combustion engine needs to be decreased.

Hereinafter, the configuration of an intake air cooling system for a marine vessel according to the present invention to decrease the temperature of the intake air supplied to the internal combustion engine is described in detail.

Figure 3:
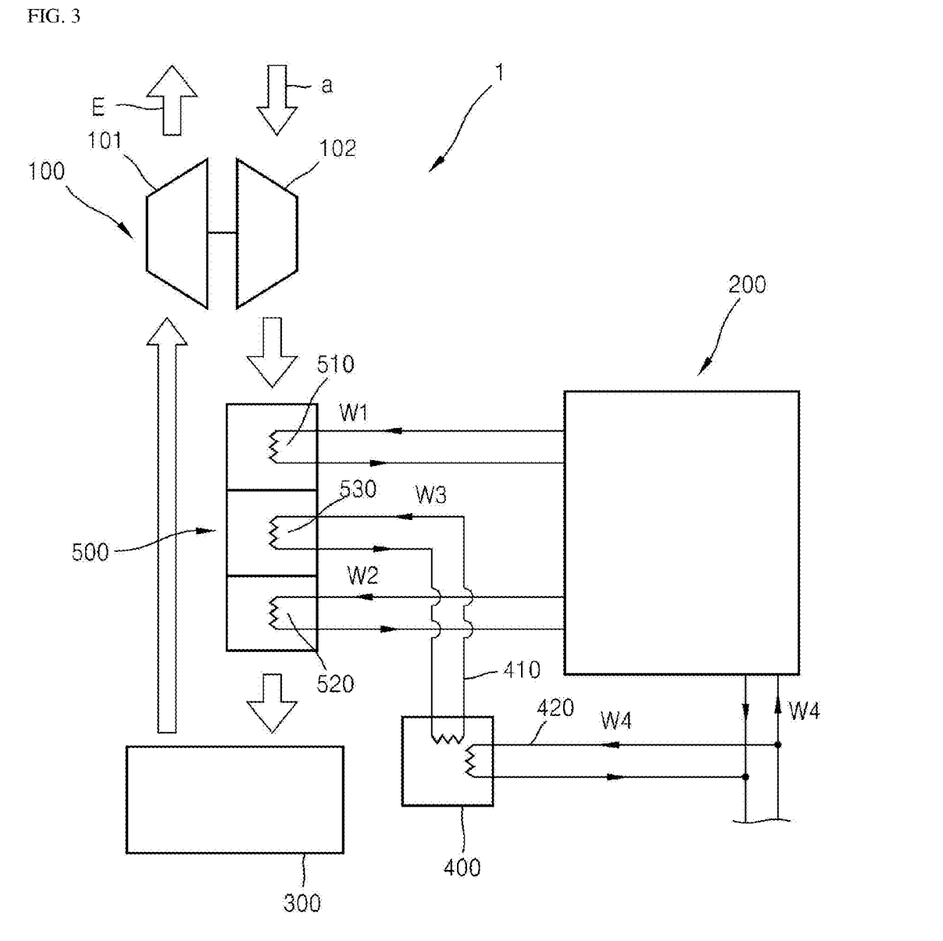
FIG. 3 illustrates a configuration of an intake air cooling system for a marine vessel according to an embodiment of the present invention.
Figure 4:
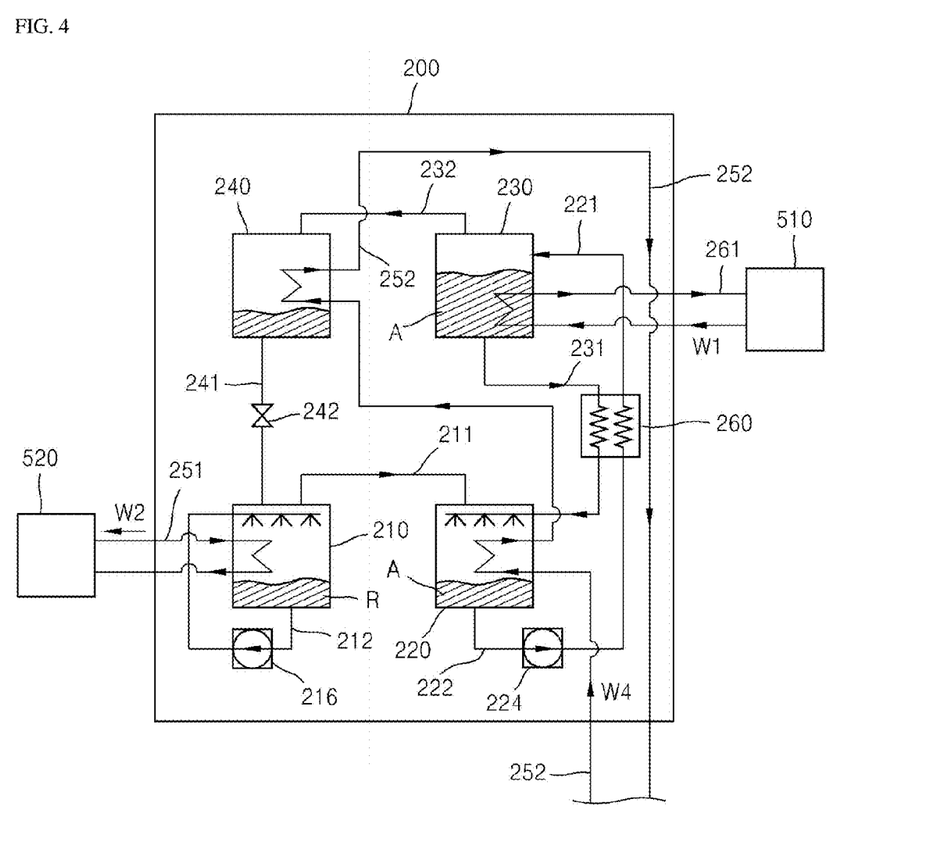
FIG. 4 illustrates a configuration of an absorption cooler of the intake air cooling system of FIG. 3.

FIG. 3 illustrates a configuration of an intake air cooling system of a marine vessel according to an embodiment of the present invention. FIG. 4 illustrates a configuration of an absorption cooler of the intake air cooling system of FIG. 3.

Referring to FIG. 3, an intake air cooling system 1 according to the present embodiment includes a turbocharger 100, an absorption cooling device 200, an auxiliary cooling device 400, and a cooling part 500. In detail, the turbocharger 100 is provided as a turbocharger for compressing intake air "a" by using a part of exhaust gas E generated in an engine 300. The turbocharger 100 includes an exhaust turbine 101 for generating a rotational force by receiving the part of the exhaust gas E and a compression turbine 102 connected to the exhaust turbine 101, receiving the rotational force, compressing the intake air "a" from the outside, and supplying the compressed intake air to the engine 300.

The turbocharger 100 includes a front end through which the intake air "a" is introduced and a rear end through which the intake air "a" compressed by the compression turbine 102 is supplied to the engine 300, with respect to the compression turbine 102. The intake air "a" compressed in the turbocharger 100 is supplied to the engine 300 and the engine 300 receiving the compressing intake air "a" may have an increased efficiency as it receives an excessive amount of the compressed intake air "a", compared to a case in which the intake air "a" in an atmosphere state is supplied.

On the other hand, when the intake air "a" is compressed in the turbocharger 100, the intake air "a" is compressed according to an adiabatic compression process and thus a temperature of the intake air "a" increases. When the intake air "a" having an increased temperature is supplied to the engine 300 without change, the efficiency of the engine 300 may be degraded as described above.

Thus, the cooling part 500 for cooling the intake air "a" compressed in the turbocharger 100 is provided between the turbocharger 100 and the engine 300. The cooling part 500 includes a plurality of cooling units 510, 520, and 530 that are disposed along a flow of the intake air "a". In the cooling units 510, 520, and 530, first, second, and third operating fluids w1, w2, and w3 that are cooled by the absorption cooling device 200 and the auxiliary cooling device 400 circulates. Thus, the intake air "a" may be cooled in a process of flowing into the engine 300.

The cooling units 510, 520, and 530 include the first cooling unit 510, the second cooling unit 520, and the third cooling unit 530. The first cooling unit 510 is arranged closest to the turbocharger 100. The second cooling unit 520 is arranged in the rear of the first cooling unit 510. The third cooling unit 530 is arranged between the first and second cooling units 510 and 520.

The first operating fluid w1 and the second operation fluid w2 cooled by the absorption cooling device 200 are supplied to and circulated in the first cooling unit 510 and the second cooling unit 520, respectively. The third operation fluid w3 cooled by the auxiliary cooling device 400 is supplied to and circulated in the third cooling unit 530.

The absorption cooling device 200 receives a heat source from the first operating fluid w1 circulating through the first cooling unit 510 of the cooling part 500 and a low temperature heat source from the second operating fluid w2 circulating through the second cooling unit 520, thereby performing a cooling operation. A configuration of the absorption cooling device 200 will be described below.

The auxiliary cooling device 400 is separately provided from the absorption cooling device 200 and includes a seawater circulation path 420 in which an auxiliary operating fluid w4 circulates and a third operating fluid circulation path 410 provided to be capable of performing heat exchange with the seawater circulation path 420, in which the third operating fluid w3 circulates. The auxiliary operating fluid w4 may be external seawater. In other words, in the auxiliary cooling device 400, the third operating fluid w3 heated through the third cooling unit 530 by the auxiliary operating fluid w4 that circulates through the seawater circulation path 420 may be cooled. A configuration of the absorption cooling device 200 will be described below.

Referring to FIG. 4, the absorption cooling device 200 includes an evaporator 210, an absorber 220, a regenerator 230, and a compressor 240 which are provided to cool the first operating fluid w1 and the second operating fluid w2 by using a coolant. The evaporator 210 is provided to cool the operating fluid to cool fuel for a vessel by using latent heat of evaporation of a coolant. In the present embodiment, fresh water may be used as a coolant R, but the present invention is not limited thereto.

On the other hand, a second operating fluid path 251 is provided in the evaporator 210. The second operation fluid w2 that passes through the evaporator 210 along the second operating fluid path 251 is cooled in the evaporator 210 by the latent heat of evaporation of the coolant R. A variety of cooling media such as clear water may be used as the second operating fluid w2.

Also, a coolant pump 216 is provided under the evaporator 210. The coolant R in a liquid state condensed in a lower portion of the evaporator 210 is supplied to an upper portion of the evaporator 210 via a coolant pipe 212. The coolant R, that is, clear water, supplied to the upper portion of the evaporator 210 is ejected toward the second operating fluid path 251 through a nozzle in the evaporator 210 and simultaneously evaporates therein.

The second operating fluid w2 flowing in the second operating fluid path 251 may be cooled by the latent heat of evaporation that is absorbed in the coolant R in an evaporation process of the coolant R. The internal pressure of the evaporator 210 may be controlled such that the internal pressure of the evaporator 210 may be formed at a pressure of about 6.5 mmHg. The coolant R, that is, clear water, may evaporate at a temperature of about 5° C.

The absorber 220 is provided to absorb the coolant R, that is, clear water in the present embodiment, which is evaporated in the evaporator 210. The evaporator 210 and the absorber 220 may be communicated with each other via a coolant supply path 211. In detail, as evaporation continues in the evaporator 210, a moisture partial pressure is gradually increased and thus an evaporation temperature increases so that an appropriate cooling effect may not be obtained. Thus, when the evaporated coolant R is absorbed in an absorption liquid A stored in the absorber 220, the evaporation pressure and temperature of the coolant R in the evaporator 210 may be maintained constant.

In the present embodiment, a lithium bromide (LiBr) solution may be used as the absorption liquid A of the absorber 220, but not limited thereto.

An auxiliary operating fluid pipe 252 in which the auxiliary operating fluid w4 cooled by the auxiliary cooling device 400 flows is provided in the absorber 220 to remove absorption heat occurring when the absorption liquid A absorbs the coolant R in the absorber 220.

On the other hand, as the absorption liquid A that is the LiBr solution continues the absorption, the concentration of the LiBr solution deceases and thus an efficiency of the absorption that the coolant R that is the LiBr solution absorbs the clear water is gradually decreased. Thus, the regenerator 230 for regenerating the absorption liquid A is provided in the absorption cooling device 200.

An absorption pump 224 is provided under the absorber 220 and supplies the LiBr solution condensed in the lower portion of the absorber 220 to the regenerator 230 via a first absorption liquid circulation pipe 221.

The regenerator 230 performs a process of increasing the concentration of LiBr in the LiBr solution, that is, an absorption liquid regeneration process, by heating the LiBr solution that is weakened by absorbing the coolant R, that is, clear water, to evaporate the clear water from the LiBr solution. The first absorption liquid circulation pipe 221 is connected to the upper portion of the regenerator 230 to transfer the weak LiBr solution from the absorber 220.

The absorption liquid A in the regenerator 230 is heated by a heating means. The first operating fluid w1 that is heated while cooling the intake air "a" compressed in the first cooling unit 510 is used as the heating means, that is, a heat source. A first operating fluid circulation path 261 through which the first operating fluid w1 flows penetrates the regenerator 230. As the absorption liquid A accommodated in the regenerator 230 receives heat from the first operating fluid circulation path 261, the absorption liquid regeneration process may be performed.

On the other hand, the absorption liquid A condensed through the regeneration process in the regenerator 230 circulates through the absorber 220 via a second absorption liquid circulation pipe 231. An absorption liquid heat exchanger 260 may be provided between the regenerator 230 and the absorber 220. A part of the first absorption liquid circulation pipe 221 and a part of the second absorption liquid circulation pipe 231 pass through the absorption liquid heat exchanger 260. Heat exchange is performed between an absorption liquid A of a low temperature and low concentration flowing in the first absorption liquid circulation pipe 221 and an absorption liquid A of a high temperature and high concentration flowing in the second absorption liquid circulation pipe 231. Accordingly, the absorption liquid heat exchanger 260 may improve a heat efficiency by drastically reducing a heating amount in the regenerator 230 and a cooling amount in the absorber 220.

The condensed LiBr solution returned to the absorber 220 absorbs the coolant R in a vapor state and becomes a low concentration. Then, the LiBr solution is circulated to the regenerator 230 to continuously repeat the heating and condensing processes.

In the regeneration process of the absorption liquid A, the coolant R in the vapor state, that is, vapor, is supplied to the compressor 240 via a connection pipe 232 connecting the regenerator 230 and the compressor 240.

The condenser 240 is provided to condense the coolant R evaporated in the regenerator 230, that is, vapor. The auxiliary operating fluid pipe 252 passing through the absorber 220 is extendedly provided in the condenser 240 as a heat exchange unit to condense the coolant R, that is, vapor, evaporated in the regenerator 230. Thus, the auxiliary operating fluid w4 passing through the absorber 220 absorbs heat from the coolant R in the vapor state in the condenser 240 so as to condense the coolant R in the vapor state into a liquid state.

The coolant R that is condensed into the liquid state, that is, clear water, may be resupplied to the evaporator 210 via a coolant pipe 241. The coolant R in the liquid state resupplied to the evaporator 210 repeats circulation in the absorption cooling device 200. An expansion valve 242 is provided in the coolant pipe 241 and thus the pressure of the coolant R flowing in the coolant pipe 241 may be decreased.

The flow of the coolant R in the absorption cooling device 200 of the intake air cooling system for a marine vessel according to the present invention will now be described below. In this case, since the operations of detailed constituent elements of the absorption cooling device 200 are described above, the descriptions thereof will be omitted herein.

The coolant R (clear water in the present embodiment) that cools the second operating fluid w2 by evaporation latent heat in the evaporator 210 of the absorption cooling device 200 is absorbed by the LiBr solution that is the absorption liquid A in the absorber 220. Then, the absorption liquid A having a decreased concentration due to the absorption of the coolant R is transferred to the regenerator 230

In the regenerator 230, the coolant R is evaporated from the absorption liquid A that absorbs an excessive amount of the coolant R, by the first operating fluid w1 that heated and circulates the inside of the regenerator 230 via the first operating fluid circulation path 261. The first operating fluid w1 evaporates the coolant R from the absorption liquid A that absorbs an excessive amount of the coolant R, by using the high-temperature exhaust gas E2 that receives heat from the exhaust gas E2 in the heat exchanger 280 during the heat exchange process.

The absorption liquid A that is condensed as the coolant R is evaporated to be separate enters the absorber 220 and performs the absorption operation again. The coolant R in the vapor state output from the regenerator 230 is supplied to the condenser 240 and cooled and condensed by the seawater and then circulates toward the evaporator 210, thereby completing a cycle of a coolant circulation process.

As the coolant circulation process is repeatedly performed, the second operating fluid w2 flowing in the second operation fluid circulation path 251 in the evaporator 210 is cooled. In the following description, the configuration of the cooling part 500 to cool the intake air "a" and supply the cooled intake air "a" to the engine 300 in the intake air cooling system for a marine vessel according to the present invention is described in detail.

Figure 5:
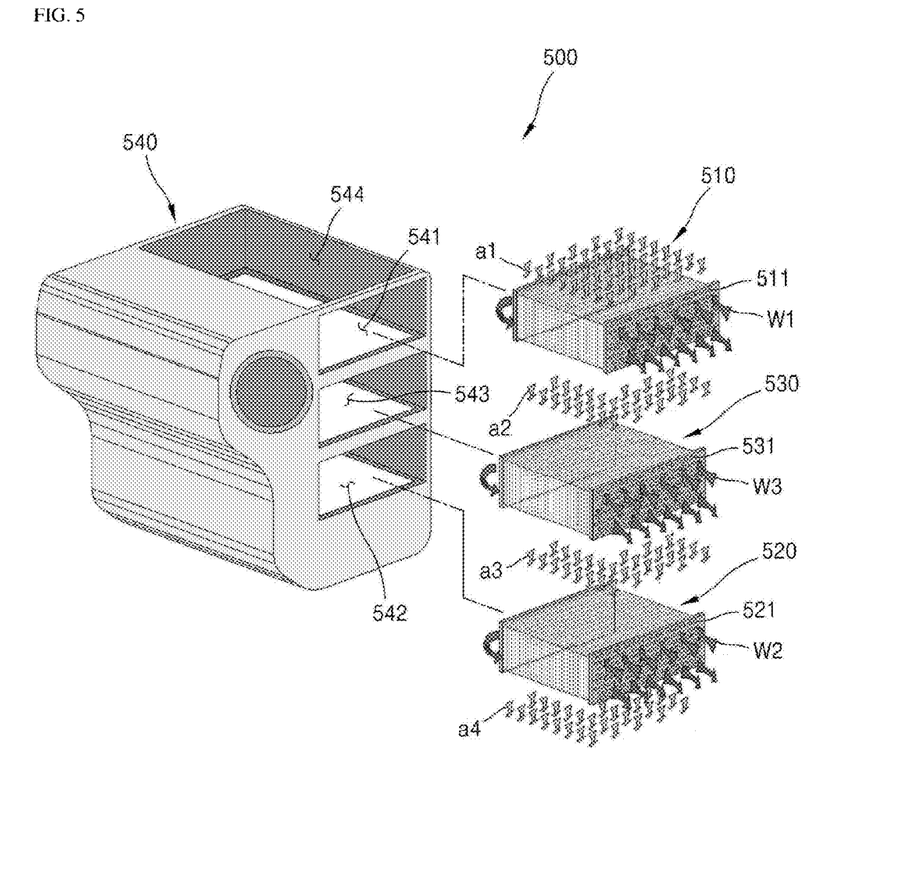
FIG. 5 illustrates a configuration of a cooling part of the intake air cooling system according to an embodiment of the present invention.

FIG. 5 illustrates a flow of the intake air "a" and a configuration of the cooling part 500 of the intake air cooling system according to an embodiment of the present invention. Referring to FIGS. 3 and 5, the cooling part 500 according to the present embodiment includes therein an intake air flow path 544 through which the intake air "a" flowing from the turbocharger 100 toward the engine 300 and further a cooling part body 540 for accommodating the cooling parts 510, 520, and 530 disposed along the intake air flow path 544.

A first slot 541, a second slot 542, and a third slot 543 for inserting the first cooling unit 510, the second cooling unit 520, and the third cooling unit 530, respectively, are formed in the cooling part body 540. The first cooling unit 510, the second cooling unit 520, and the third cooling unit 530 each may be formed in a cartridge type to be detachably provided in the first slot 541, the second slot 542, and the third slot 543, respectively.

A first operating fluid path 511, a second operating fluid path 521, and a third operating fluid circulation path 531, in which the first, second, and third operating fluids w1, w2, and w3 respectively flow to perform heat exchange with the intake air "a" supplied to the engine 300 via the first cooling unit 510, the second cooling unit 520, and the third cooling unit 530, are respectively formed in the first, second, and third cooling units 510, 520, and 530.

The process of cooling the intake air "a" by the cooling part 500 will be described in detail. For convenience of explanation, the intake air "a" flowing from the rear end of the turbocharger 100 toward the first cooling unit 510 is referred to a first state intake air "a1", the intake air "a" flowing from the first cooling unit 510 toward the third cooling unit 530 is referred to a second state intake air "a2", the intake air "a" flowing from the third cooling unit 530 toward the second cooling unit 520 is referred to a third state intake air "a3", and the intake air "a" flowing from the second cooling unit 520 toward the engine 300 is referred to a fourth state intake air "a4", The first state intake air "a1" is the intake air "a" compressed in the turbocharger 100 to have a temperature of about 180° C. and is input to the first cooling unit 510. The first operating fluid 510 is cooled down to a temperature of about 85° C. in the regenerator 230 of the absorption cooling device 200 and is supplied to the first cooling unit 510. The first operating fluid 510 is heated to a temperature of about 95° C. due to the heat exchange with the first state intake air "a1" in the first cooling unit 510 and circulates to the absorption cooling device 200.

In the process of flowing through the first cooling unit 510, the second state intake air "a2" cooled down to a temperature of about 160° C. is input to the third cooling unit 530. The third operating fluid w3 that is cooled down to a temperature of about 35° C. due to the heat exchange with the seawater in the auxiliary cooling device 400 is supplied to the third cooling unit 530. The third operating fluid w3 performs heat exchange with the second state intake air "a2" and then is heated to a temperature of about 40° C. to 50° C., circulating to the auxiliary cooling device 400.

In the process of flowing through the third cooling unit 530, the third state intake air "a3" cooled down to a temperature of about 40° C. is input to the second cooling unit 520. The second operating fluid w2 cooled down to a temperature of about 7° C. in the evaporator 210 of the absorption cooling device 200 is supplied to the second cooling unit 520. The second operating fluid w2 is heated due to the heat exchange with the third state intake air "a3" and then circulates to the evaporator 210 of the absorption cooling device 200.

In the process of flowing through the second cooling unit 520, the fourth state intake air "a4" cooled down to a temperature of about 10° C. is supplied to the engine 300.

In the above descriptions, the temperatures of the first to fourth intake airs "a1", "a2", "a3", and "a4" and the temperatures of the first to third operating fluids w1, w2, and w3 are exemplary values. Each of the temperatures may be set differently from those of the present embodiment within a range of temperatures capable of operating the absorption cooling device 200 according to various factors such as a compression rate, a compression capacity, etc.

Also, the first to third operating fluids w1, w2, and w3 respectively circulating the first to third cooling units 510, 520, and 530 may be clear water in the present embodiment, but the present invention is not limited thereto.

The first cooling unit 510 and the second cooling unit 520 operate as the heat sources with respect to the absorption cooling device 200 to cool the intake air "a". The third cooling unit 530 receives the operating fluid cooled by the auxiliary cooling device 400. Accordingly, the first and second cooling units 510 and 520 and the third cooling unit 530 may be independently performed. In other words, since the above cooling units independently perform cooling, even when any one of the absorption cooling device 200 and the auxiliary cooling device 400 malfunctions, the intake air "a" may be cooled at its minimum.

According to the present embodiment, since the absorption cooling device for cooling the high-temperature intake air compressed by the turbocharger is operated by the heat source obtained from the intake air, a separate heat source for operating the absorption cooling device is not needed and thus energy efficiency of a cooling system to cool the intake air is increased.

Furthermore, since the high-temperature intake air compressed by the turbocharger is cooled through a plurality of steps when being supplied to the engine, compared to a case of cooling the intake air at once, a cooling efficiency of the intake air is increased.

Figure 6:
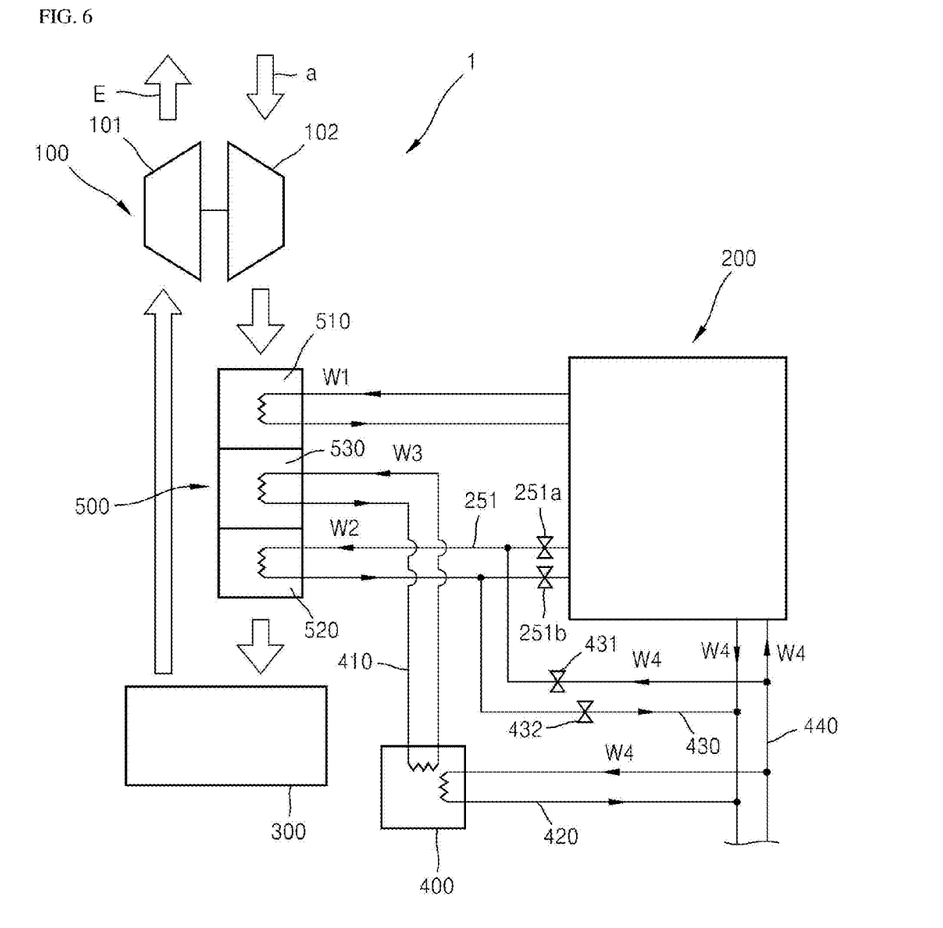
FIG. 6 illustrates a configuration of an intake air cooling system for a marine vessel according to another embodiment of the present invention.

FIG. 6 illustrates a configuration of an intake air cooling system for a marine vessel according to another embodiment of the present invention. In the present embodiment, since the configuration of the present embodiment is the same as that of the above-described embodiment of FIGS. 3 to 5, except for the configuration of supplying a cooling fluid to the second cooling unit, only a characteristic feature of the present embodiment is mainly discussed below.

Referring to FIG. 6, the second operating fluid w2 and the auxiliary operating fluid w4 may selectively circulate in the second cooling unit 520 according to the present embodiment. In detail, the intake air cooling system 1 according to the present embodiment further includes an auxiliary circulation path 430 having one end connected to the second operating fluid path 251 and the other end connected to a seawater circulation path 440.

The auxiliary circulation path 430 includes a first auxiliary valve 431 and a second auxiliary valve 432 for flowing or blocking the auxiliary operating fluid w4, that is, the seawater, from the seawater circulation path 440 to the second operating fluid path 251. Also, the second operating fluid path 251 includes a first main valve 251a and a second main valve 251b for selectively blocking the flow of the second operating fluid w2.

When the absorption cooling device 200 of the intake air cooling system 1 according to the present embodiment normally operates, the first main valve 251a and the second main valve 251b are set to be open and the first auxiliary valve 431 and the second auxiliary valve 432 are set to be closed. In this case, the second operating fluid w2 cooled in the absorption cooling device 200 is supplied to the second cooling unit 520 along the second operating fluid path 251, thereby cooling the intake air "a".

When the absorption cooling device 200 is not normally operated, that is, the absorption cooling device 200 does not work due to an unexpected matter such as a malfunction or breakdown, the first main valve 251a and the second main valve 251b are set to be closed and the first auxiliary valve 431 and the second auxiliary valve 432 are set to be open. In such a case, the auxiliary operating fluid w4, that is, the external seawater at any temperature between about 0° C. to 25° C., flows in the second operating fluid path 251 and is supplied to the second cooling unit 520 so that the intake air "a" may be cooled.

A corrosion prevention structure to prevent corrosion of the second operating fluid path 251 due to the seawater may be provided on an inner surface of the second operating fluid path 251. In other words, according to the present embodiment, even when the absorption cooling device 200 malfunctions, the cooling of the intake air "a" may be performed not only by the third cooling unit 530 but also by the second cooling unit 520. The auxiliary operating fluid w4 passing through the second cooling unit 520 may be discharged to the outside of the marine vessel.

Although in the intake air cooling system 1 according to the present embodiment the intake air "a" is cooled as any one of the second operating fluid w2 and the auxiliary operating fluid w4 flows in the second cooling unit 520 according to the operating state of the absorption cooling device 200, a configuration of flowing any one of the second operating fluid w2 and the third operating fluid w3 may also be included in the present embodiment.

Figure 7:
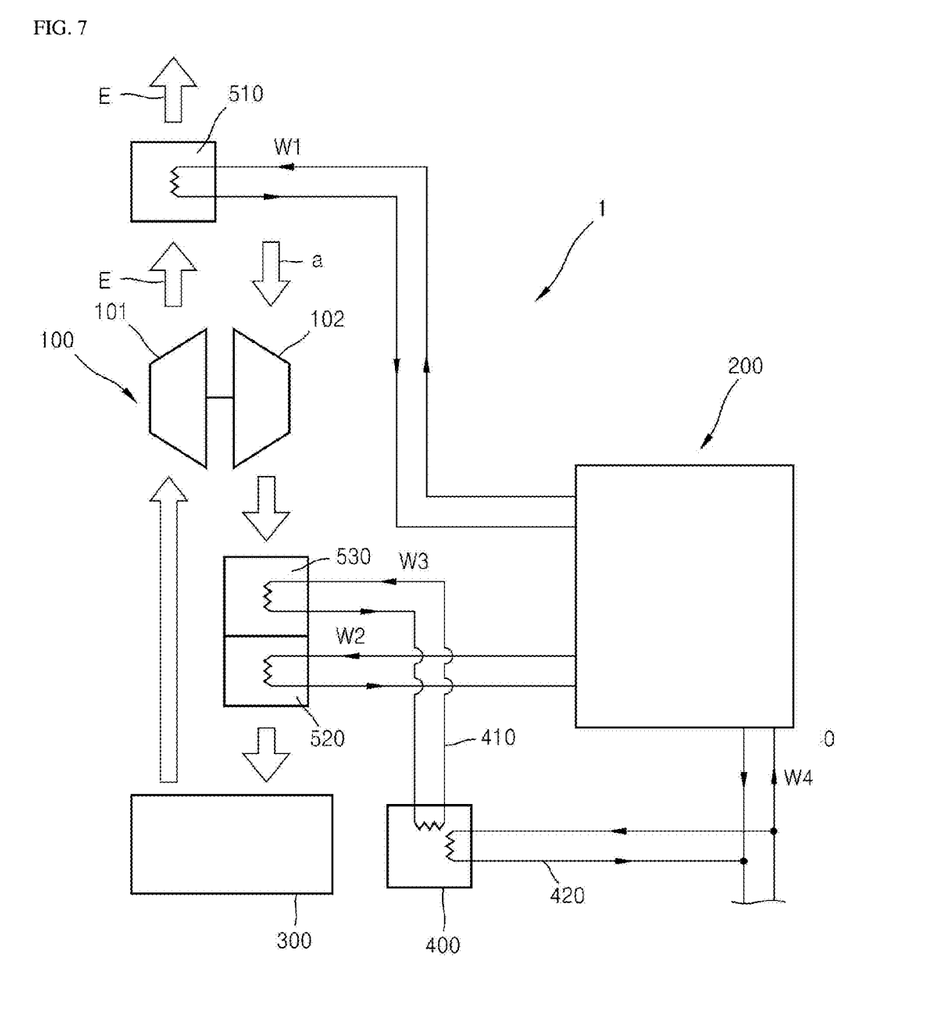
FIG. 7 illustrates a configuration of an intake air cooling system for a marine vessel according to another embodiment of the present invention.

FIG. 7 illustrates a configuration of an intake air cooling system for a marine vessel according to another embodiment of the present invention. In the present embodiment, since the configuration of the present embodiment is the same as that of the above-described embodiment of FIGS. 3 to 5, except for the arrangement of the first cooling unit, only a characteristic feature of the present embodiment is mainly discussed below.

Referring to FIG. 7, a temperature of the exhaust gas E discharged from the exhaust turbine 101 of the turbocharger 100 is generally set to be higher than that of the intake air "a" compressed by the compression turbine 102. Accordingly, the first cooling unit 510 of the intake air cooling system 1 according to the present embodiment is disposed at an exhausting manifold for discharging the exhaust gas E to the outside from the exhaust turbine 101 of the turbocharger 100.

The first cooling unit 510 may be formed as an economizer that allows the first operating fluid w1 flowing therein to be heated to a form of vapor by the waste heat of the exhaust gas E.

As the first cooling unit 510 is disposed on the exhausting manifold, only the second cooling unit 520 and the third cooling unit 530 may be provided in the cooling part body 540 according to the present embodiment. However, the present invention is not limited thereto and three or more cooling units may be provided in the cooling part body 540. In other words, the absorption cooling device 200 of the intake air cooling system 1 according to the present embodiment operates by cooling the exhaust gas E discharged to the outside and obtaining a heat source therefrom. According to the present embodiment, a difference in the temperature between the heat sources determining the cooling efficiency of the absorption cooling device 200 may be increased.

Figure 8:
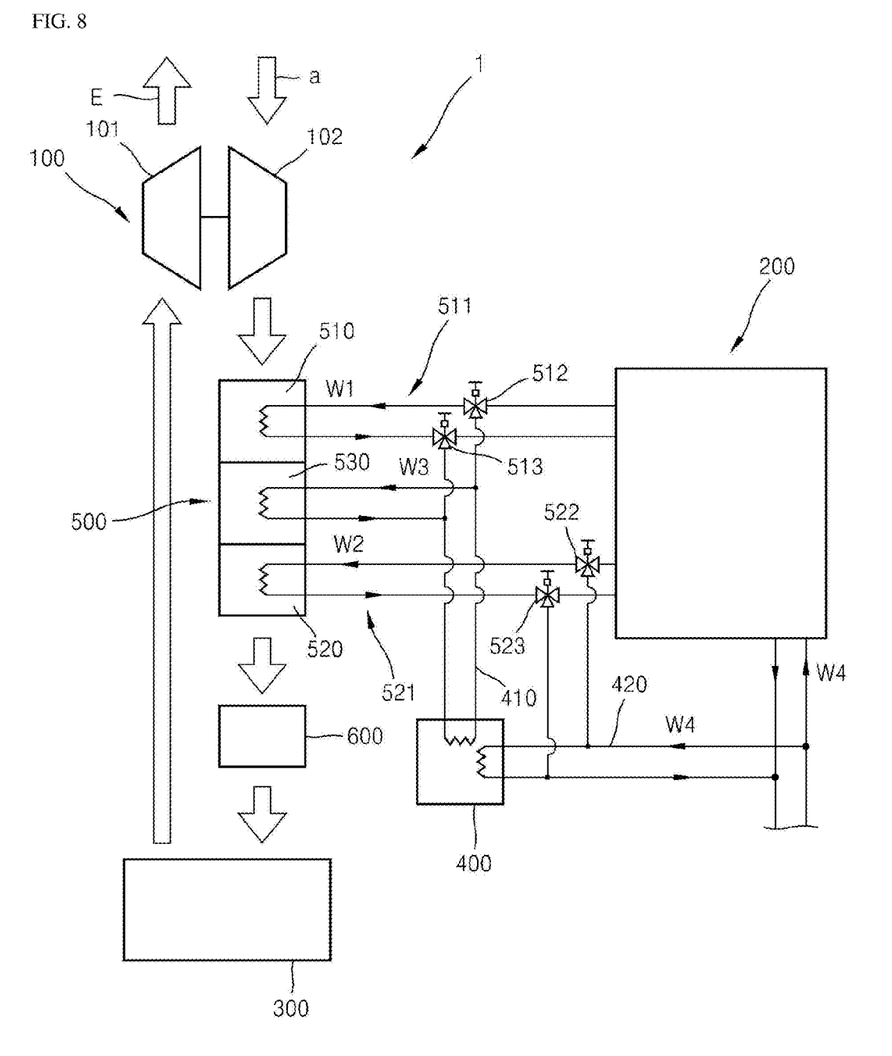
FIG. 8 illustrates a configuration of an intake air cooling system for a marine vessel according to another embodiment of the present invention.

FIG. 8 illustrates a configuration of an intake air cooling system for a marine vessel according to another embodiment of the present invention. In the present embodiment, since the configuration of the present embodiment is the same as that of the above-described embodiment of FIGS. 3 to 5, except for the configurations of the operating fluid path and a drain water processing device, only a characteristic feature of the present embodiment is mainly discussed below.

Referring to FIG. 8, the third operating fluid circulation path 410 and the seawater circulation path 420 are connected to the first operating fluid path 511 and the second operating fluid path 521 of the intake air cooling system 1 of the present embodiment, respectively.

A first switch valve 512, a second switch valve 513, a third switch valve 522, and a fourth switch valve 523 are provided at positions where the first operating fluid path 511 and the second operating fluid path 521 are respectively connected to the third operating fluid circulation path 410 and the seawater circulation path 420. In other words, the first switch valve 512 and the second switch valve 513 to which an upstream side path and a downstream side path of the third operating fluid circulation path 410 are connected are provided at an upstream side position and a downstream side position of the first operating fluid path 511, respectively. Also, the third switch valve 522 and the fourth switch valve 523 to which an upstream side path and a downstream side path of the seawater circulation path 420 are connected are provided at an upstream side position and a downstream side position of the second operating fluid path 521, respectively.

The first switch valve 512, the second switch valve 513, the third switch valve 522, and the fourth switch valve 523 are formed of 3-way valves. The first and second switch valves 512 and 513 selectively open or close the positions so that the third operating fluid w3 enters into the first operating fluid path 511. The third and fourth switch valves 522 and 523 selectively open or close the positions so that the auxiliary operating fluid w4 enters into the second operating fluid path 521.

In other words, in a normal case, the first and second switch valves 512 and 513 and the third and fourth switch valves 522 and 523 make connections between the absorption cooling device 200 and each of the first and second operating fluid paths 511 and 521 and simultaneously shut the connections between the first operating fluid path 511 and the third operating fluid circulation path 410 and between the second operating fluid path 521 and the seawater circulation path 420.

On the other hand, when a defect occurs in the absorption cooling device 200 and thus cooling of the intake air "a" is not normally performed in the first and second cooling units 510 and 520, the first and second switch valves 512 and 513 and the third and fourth switch valves 522 and 523 shut the connection between the absorption cooling device 200 and each of the first and second operating fluid paths 511 and 513, respectively. The first and second switch valves 512 and 513 and the third and fourth switch valves 522 and 523 make connections between the first operating fluid path 511 and the third operating fluid circulation path 410 and between the second operating fluid path 521 and the seawater circulation path 420, respectively. Accordingly, even when the absorption cooling device 200 is not normally operated, the cooling of the compressed air "a" may be normally performed.

Also, the absorption cooling device 200 according to the present embodiment may further include a temperature sensor (not shown) for sensing temperatures of the first and second operating fluids w1 and w2 supplied to the first and second cooling units 510 and 520 from the absorption cooling device 200, to determine whether the absorption cooling device 200 is normally operated.

Thus, when the temperature sensor senses that the temperatures of the first operating fluid w1 and the second operating fluid w2 are higher than preset temperatures, the first to fourth switch valves 511, 512, 521, and 522 may block the supply of the first and second operating fluids w1 and w2 and enable supply of the third and auxiliary operating fluids w3 and w4 with respect to the first and second cooling units 510 and 520.

Although in the present embodiment temperature sensors for measuring the temperatures of the first and second operating fluids w1 and w2 are included, a configuration of including a temperature sensor only for sensing a temperature of any one of the first and second operating fluids w1 and w2 may be included in the configuration of the present embodiment.

The intake air cooling system 1 according to the present embodiment further includes a drain water processing device 600 for processing drain water generated during the process of cooling the compressed air "a". The drain water processing device 600 is provided between the cooling part 500 and the engine 300 and collects drain water drained inside the compressed air "a" that is cooled while passing through the cooling part 500 and restricts direct supply of the compressed air "a" including the drain water to the engine 300. Since the supply of the compressed air "a" including an excessive amount of drain water to the engine 300 is prevented, the corrosion of the engine 300 due to the drain water may be restricted.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in descriptive sense only and not for purposes of limitation. Therefore, to the scope of the invention is defined not by the detailed description of the invention but by the appended claims, and all differences within the scope will be construed as being included in the present invention.

INDUSTRIAL APPLICABILITY

The present invention may be used for a marine vessel. The marine vessel includes not only marine vessels capable of self-sailing and transferring persons or cargos, but also floating marine structures for storing and unloading cargos, such as, a liquefied natural gas-floating production storage offloading (LNG-FPSO), a floating storage unit (FSU), etc.

The invention claimed is:

1. An intake air cooling system for a marine vessel, the intake air cooling system comprising:
    a turbocharger configured to compress externally introduced intake air by using part of exhaust gas generated from an engine and including a front end from which the intake air is introduced and a rear end through which the intake air is supplied to the engine;
    a cooling part configured to cool at least one of the intake air compressed in the turbocharger and the exhaust gas passing through the turbocharger and including one or more cooling units arranged along a flow of the intake air or the exhaust gas; and
    an absorption cooling device configured to receive a heat source from a first operating fluid circulating through the cooling units,
    wherein the absorption cooling device comprises:
    an evaporator configured to cool a second operating fluid by using evaporation latent heat of a coolant;
    an absorber configured to accommodate an absorption liquid that absorbs the coolant evaporated in the evaporator;
    a regenerator configured to heat and regenerate the absorption liquid of the absorber that is weakened by the absorption of the coolant, by using the intake air discharged from the turbocharger and supplied as the heat source; and
    a condenser configured to condense the coolant evaporated in the regenerator.

2. The intake air cooling system of claim 1, wherein the cooling part comprises:
    a first cooling unit through which the first operating fluid that performs heat exchange with the intake air discharged from the turbocharger circulates; and
    a second cooling unit disposed at the rear of the first cooling unit and through which the second operating fluid that performs heat exchange with the intake air circulates.

3. The intake air cooling system of claim 2, wherein at least one of the second operating fluid flowing in the absorption cooling device and seawater outside the marine vessel flows in the second cooling unit of the cooling part.

4. The intake air cooling system of claim 3, further comprising:
    a second operating fluid path provided between the second cooling unit and the absorption cooling device and through which the second operating fluid flows, and including at least one main valve for selectively opening or closing flow of the second operating fluid; and
    an auxiliary circulation path connected on the second operating fluid path at a position between the second cooling unit and the main valve and through which the seawater outside the marine vessel flows, and including at least one auxiliary valve for opening or closing flow of the seawater.

5. The intake air cooling system of claim 2, wherein the cooling part further comprises a third cooling unit through which a third operating fluid that performs heat exchange with the seawater outside the marine vessel circulates.

6. The intake air cooling system of claim 5, further comprising an auxiliary cooling device for performing heat exchange between the third operating fluid and the seawater, wherein the cooling of the intake air by the third cooling unit is performed independently of the cooling by the first cooling unit and the second cooling unit.

7. The intake air cooling system of claim 5, wherein a third operating fluid circulation path, through which the third operating fluid circulates, is connected to the first operating fluid path through which the first operating fluid is supplied to the first cooling unit,
    the intake air cooling system further comprising a switch valve for selectively shutting supply of the first operating fluid and performing supply of the third operating fluid, with respect to the first cooling unit, the switch valve being provided at a position of the first operating fluid path to which the third operating fluid circulation path is connected.

8. The intake air cooling system of claim 5, wherein a seawater circulation path, through which the seawater circulates, is connected to a second operating fluid path through which the second operating fluid is supplied to the second cooling unit,
    the intake air cooling system further comprising a switch valve for selectively shutting supply of the second operating fluid and performing supply of the seawater, with respect to the second cooling unit, the switch valve being provided at a position of the second operating fluid path to which the seawater circulation path is connected.

9. The intake air cooling system of claim 6, wherein the third cooling unit is arranged between the first cooling unit and the second cooling unit and a temperature of the second operating fluid flowing in the second cooling unit is lower than that of the third operating fluid flowing in the third cooling unit.

10. The intake air cooling system of claim 1, wherein the absorption cooling device further comprises a temperature sensor that senses a temperature of the first operating fluid and the second operating fluid supplied to the first cooling unit and the second cooling unit, respectively.

11. An intake air cooling system for a marine vessel, the intake air cooling system comprising:
    a turbocharger configured to compress externally introduced intake air by using part of exhaust gas generated from an engine and including a front end from which the intake air is introduced and a rear end through which the intake air is supplied to the engine;
    a cooling part configured to cool at least one of the intake air compressed in the turbocharger and the exhaust gas passing through the turbocharger and including one or more cooling units arranged along a flow of the intake air or the exhaust gas; and
    an absorption cooling device configured to receive a heat source from a first operating fluid circulating through the one or more cooling units, wherein the absorption cooling device comprises:

an evaporator configured to cool a second operating fluid by using evaporation latent heat of the coolant;

an absorber configured to accommodate an absorption liquid that absorbs the coolant evaporated in the evaporator;

a regenerator configured to heat and regenerate the absorption liquid of the absorber that is weakened by the absorption of the coolant, by using part of the exhaust gas supplied as the heat source; and a condenser configured to condense the coolant evaporated in the regenerator, wherein the cooling part comprises a first cooling unit through which the first operating fluid flows to cool the exhaust gas and a second cooling unit through which the second operating fluid flows to cool the compressed intake air, the first cooling unit is provided on an exhausting manifold that discharges the exhaust gas from the turbocharger and allowing the exhaust gas to perform heat exchange with the first operating fluid, and the second cooling unit is provided between the turbocharger and the engine and performing heat exchange between the intake air compressed in the turbocharger and the second operating fluid.

12. The intake air cooling system of claim 11, wherein the cooling part further comprises a third cooling unit through which a third operating fluid that performs heat exchange with a seawater outside the marine vessel circulates.

13. The intake air cooling system of claim 12, further comprising an auxiliary cooling device that performs heat exchange between the third operating fluid and the seawater outside the marine vessel, wherein the cooling of the intake air by the third cooling unit is performed independently of the cooling by the first cooling unit and the second cooling unit.

14. The intake air cooling system of claim 11, wherein the first cooling unit is a low pressure vapor generator that generates vapor by heat exchange with the exhaust gas.

15. The intake air cooling system of claim 1, wherein the cooling part comprises a cooling part body in which an intake air flow path through which the intake air flows from the turbocharger to the engine is formed and the one or more cooling units arranged along the intake air flow path are formed.

16. The intake air cooling system of claim 15, wherein the one or more cooling units are formed in a cartridge type to be detachably provided on the cooling part.

17. The intake air cooling system of claim 1, further comprising a drain water processing device that is provided between the cooling part and the engine and processes drain water generated from compressed air cooled by passing through the cooling part.

* * * * *